US009189782B2

(12) United States Patent
Nimiya

(10) Patent No.: US 9,189,782 B2
(45) Date of Patent: Nov. 17, 2015

(54) INFORMATION PROCESSING APPARATUS AND INFORMATION DISPLAY METHOD BY THE SAME

(71) Applicant: TOSHIBA TEC KABUSHIKI KAISHA, Shinagawa-ku, Tokyo (JP)

(72) Inventor: Shigeki Nimiya, Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/522,669

(22) Filed: Oct. 24, 2014

(65) Prior Publication Data

US 2015/0193758 A1    Jul. 9, 2015

(30) Foreign Application Priority Data

Jan. 8, 2014    (JP) .................................. 2014-001859

(51) Int. Cl.
  *G06K 15/00*    (2006.01)
  *G06Q 20/20*    (2012.01)
  *G06K 9/62*    (2006.01)

(52) U.S. Cl.
  CPC ............ *G06Q 20/208* (2013.01); *G06K 9/6202* (2013.01); *G06K 9/6215* (2013.01)

(58) Field of Classification Search
  CPC .......... G06K 15/00; G06K 19/00; G06F 7/08; G06F 17/00; G06F 19/00; G06Q 30/00; G06Q 90/00; G06Q 19/00
  USPC .......................... 235/383, 381, 385, 375, 487
  See application file for complete search history.

(56) References Cited

U.S. PATENT DOCUMENTS

| 2010/0153664 | A1* | 6/2010 | Yoshida ........................ 711/156 |
| 2012/0259701 | A1* | 10/2012 | Kumazawa et al. ....... 705/14.53 |
| 2012/0265628 | A1* | 10/2012 | Jacobs ............................ 705/23 |
| 2012/0312605 | A1* | 12/2012 | Teraoka .................... 177/25.14 |
| 2013/0101168 | A1 | 4/2013 | Naito et al. |
| 2013/0141585 | A1* | 6/2013 | Naito et al. .................. 348/150 |
| 2014/0019311 | A1* | 1/2014 | Tanaka ........................ 705/27.2 |

FOREIGN PATENT DOCUMENTS

| JP | 2004-206357 | 7/2004 |
| JP | 2010-198137 | 9/2010 |
| JP | 2012-069094 | 4/2012 |

* cited by examiner

*Primary Examiner* — Edwyn Labaze
(74) *Attorney, Agent, or Firm* — Amin, Turocy & Watson, LLP

(57) ABSTRACT

In accordance with one embodiment, an information processing apparatus comprises an acquisition module configured to acquire an image of a commodity, a detection module configured to detect the commodity from the image acquired by the acquisition module, a recognition module configured to compare the feature amount of the commodity detected by the detection module with the feature amount of each reference commodity to recognize the reference commodity of which the similarity degree is greater than a threshold value as a commodity candidate, a commodity candidate display module configured to display the commodity candidates recognized before a given waiting time period elapses in the descending order of similarity degree, and then successively display the commodity candidates recognized after the waiting time period elapses in sequence, and a reception module configured to receive an operation of selecting one from the displayed commodity candidates.

10 Claims, 10 Drawing Sheets

| COMMODITY ID | COMMODITY NAME | UNIT PRICE | COMMODITY IMAGE | FEATURE AMOUNT |
|---|---|---|---|---|
| XXXXXXX1 | APPLE | 70YEN | 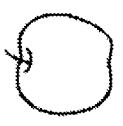 | ... |
| XXXXXXX2 | BANANA | 200YEN | 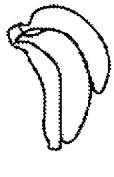 | ... |
| XXXXXXX3 | ORANGE | 90YEN | 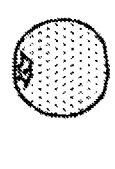 | ... |
| XXXXXXX4 | LEMON | 100YEN | 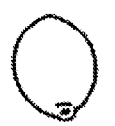 | ... |
| ... | ... | ... | ... | ... |
| XXXXX101 | CABBAGE | 200YEN |  | ... |
| ... | ... | ... | ... | ... |
F1
FIG.3

INFORMATION PROCESSING APPARATUS AND INFORMATION DISPLAY METHOD BY THE SAME

CROSS-REFERENCE TO RELATED APPLICATION

This application is based upon and claims the benefit of priority from Japanese Patent Application No. 2014-001859, filed Jan. 8, 2014, the entire contents of which are incorporated herein by reference.

FIELD

Embodiments described herein relate generally to an information processing apparatus which recognizes commodity candidates and a method for displaying the commodity candidates.

BACKGROUND

Conventionally, there is a technology in which the feature amount of an object is extracted from image data obtained by photographing the object and the extracted feature amount is compared with the prepared data indicating the feature amount of a registered each reference object to recognize the category of the object. Moreover, a store system in which such technology is applied to the recognition (identification) of a commodity such as vegetables and fruits and the sales of the recognized commodity is registered is proposed. In such a store system, in a case in which there are a plurality of commodities (commodity candidates) serving as a recognized candidate for the commodity, the commodity candidates are displayed in the descending order of similarity degree with the commodity and a selection operation for the commodity candidates from an operator is received.

However, in the conventional constitution and operation stated above, the display order of the commodity candidates is interchanged in a case in which a commodity candidate having a similarity degree higher than that of the commodity candidate presently displayed is recognized even in a case in which one commodity is held over against a reading window because the commodity candidates are displayed in the descending order of similarity degree. In this case, if the display order of commodity candidates is suddenly interchanged at the timing an operator just selects a commodity candidate displayed, there is a possibility that the operator inadvertently selects a commodity candidate which is not desired. Thus, a technology is needed to avoid such an incorrect selection.

BRIEF DESCRIPTION OF THE DRAWINGS

FIG. 3 is a diagram schematically illustrating one example of data arrangement of a PLU file of the POS terminal shown in FIG. 2;

DETAILED DESCRIPTION

In accordance with one embodiment, an information processing apparatus comprises an acquisition module, a detection module, a recognition module, a commodity candidate display module and a reception module. The acquisition module acquires an image of a commodity. The detection module detects the commodity from the image acquired by the acquisition module. The recognition module compares the feature amount of the commodity detected by the detection module with the feature amount of each reference commodity to recognize the reference commodity of which the similarity degree is greater than a threshold value as a commodity candidate. The commodity candidate display module displays the commodity candidates recognized before a given waiting time period elapses in the descending order of similarity degree, and then successively displays the commodity candidates recognized after the waiting time period elapses in sequence. The reception module receives an operation of selecting one from the displayed commodity candidates.

Hereinafter, taking a checkout system as an example, an information processing apparatus and program according to the present embodiment are described with reference to the accompanying drawings. A store system is a checkout system (POS system) comprising a POS terminal for registering commodities and for carrying out the settlement in one transaction. The present embodiment is an example of application to a checkout system introduced to a store such as a supermarket and the like.

Figure 1:
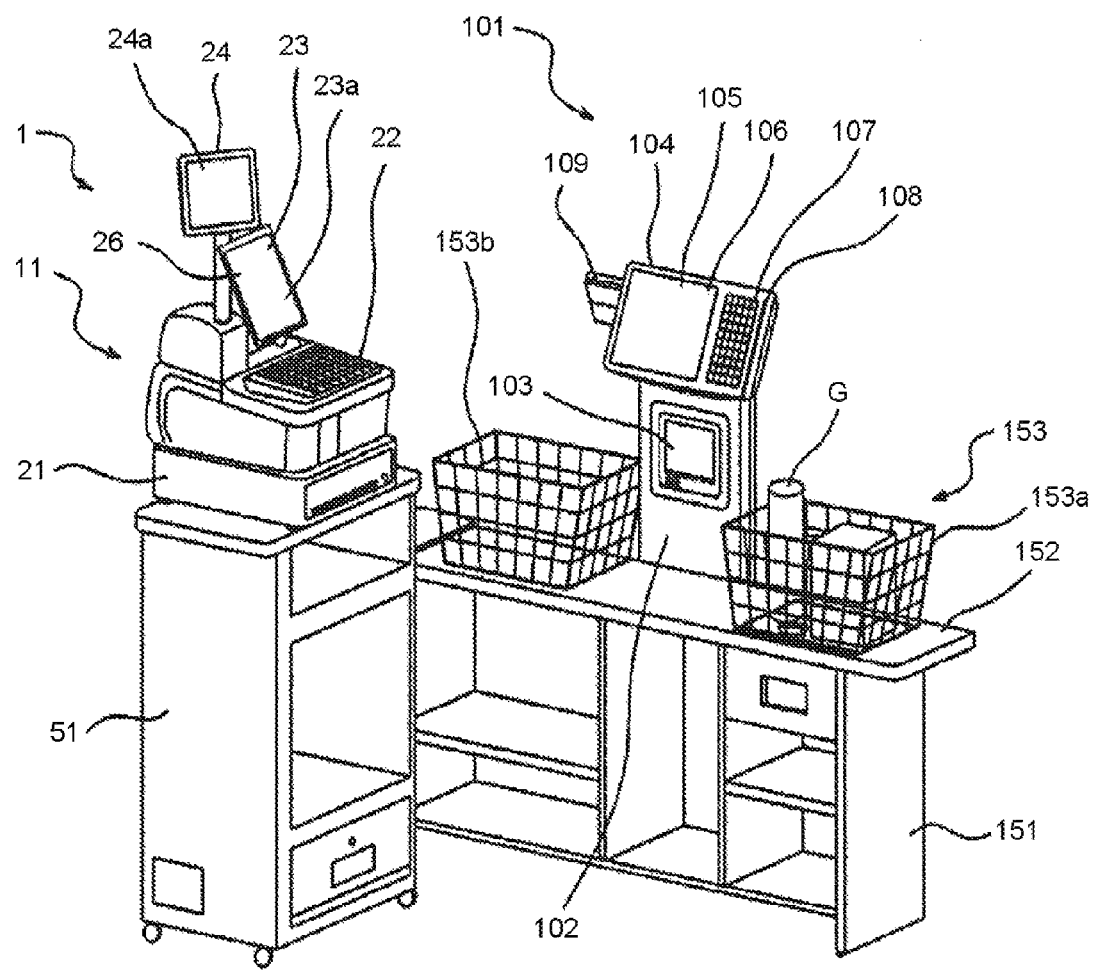
FIG. 1 is a perspective view illustrating an external constitution of a checkout system including a POS terminal and a commodity reading apparatus according to an embodiment.

FIG. 1 is a perspective view illustrating an external constitution of a checkout system 1. As shown in FIG. 1, the checkout system 1 comprises a POS terminal 11 and a commodity reading or scanning apparatus 101 serving as an information processing apparatus.

The POS terminal 11 is placed on a drawer 21 on a checkout counter (register table) 51. The drawer 21 is opened or closed under the control of the POS terminal 11. The POS terminal 11 is equipped with a keyboard 22, a display device for operator 23 and a display for customer 24. The keyboard 22 is arranged on the upper surface of the POS terminal 11 for an operator (shop clerk) who operates the POS terminal 11. The display device 23 for displaying information to the operator is arranged at a position opposite to the operator with respect to the keyboard 22. The display device 23 displays information on a display screen 23a thereof. A touch panel 26 is laminated on the display screen 23a. The display for customer 24 is vertically arranged to be rotatable at a backside to the display device 23. The display for customer 24 displays information on a display screen 24a thereof.

The display for customer 24 shown in FIG. 1 is in a state in which the display screen 24a thereof faces the operator in FIG. 1, however, the display for customer 24 can be rotated such that the display screen 24a is directed to a customer who stands across a counter table 151 to display information to the customer.

The counter table 151 is formed in horizontally elongated shape along a customer passage and is arranged to be in an L-shape with the checkout counter 51 on which the POS terminal 11 is placed. A commodity receiving surface 152 is formed on the counter table 151. Shopping basket 153 which receives a commodity G therein is placed on the commodity receiving surface 152. It can be understood to classify the shopping basket 153 on the counter table 151 into a first shopping basket 153a brought to the counter table 151 by a customer and a second shopping basket 153b placed facing the first shopping basket 153a across the commodity reading apparatus 101.

The commodity reading apparatus 101, which is connected with the POS terminal 11 to be capable of sending and receiving data, is arranged on the commodity receiving surface 152 of the counter table 151. The commodity reading apparatus 101 comprises a thin rectangular housing 102 vertically arranged on the counter table 151.

A reading window 103 is arranged at the front side of the housing 102. A display and operation section 104 is installed on the upper portion of the housing 102. A display device 106 such as a liquid crystal display device on the surface of which a touch panel 105 is laminated is arranged on the display and operation section 104. A keyboard 107 is arranged at the right side of the display device 106. A card scanning slot 108 of a card reader (not shown) is arranged at the right side of the keyboard 107. A display for customer 109 for providing information for a customer is arranged at the left side of the display and operation section 104.

Commodities G purchased in one transaction are put in the first shopping basket 153a and are brought to the counter table 151 by a customer. The commodities G in the first shopping basket 153a are moved one by one to the second shopping basket 153b by the operator who operates the commodity reading apparatus 101. During the movement, the commodity G is directed to the reading window 103 of the commodity reading apparatus 101. At this time, an image capturing section 164 (referring to FIG. 2) arranged in the housing 102 captures an image of the commodity G through the reading window 103.

Figure 2:
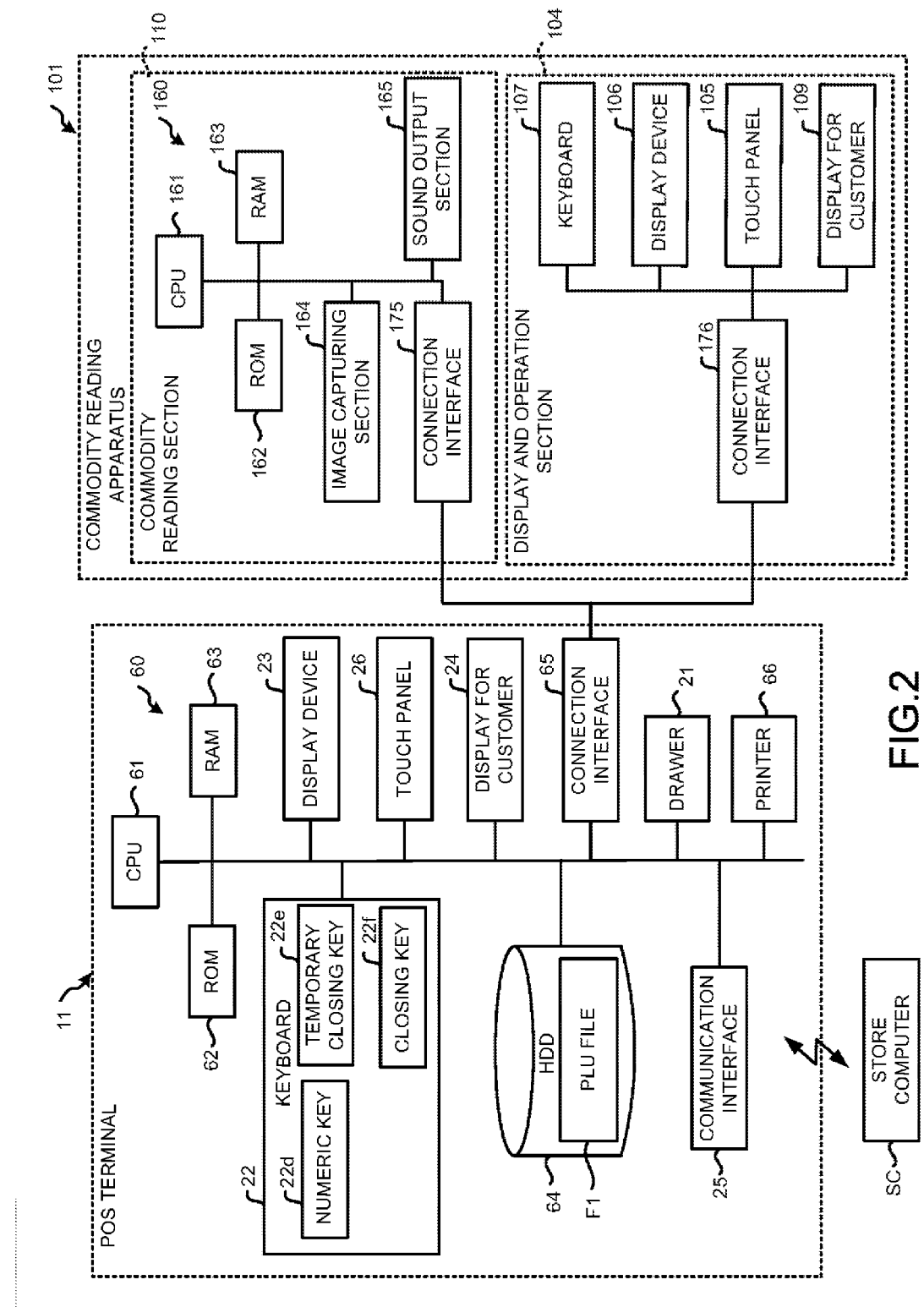
FIG. 2 is a block diagram illustrating a hardware constitution of the POS terminal and the commodity reading apparatus shown in FIG. 1.

FIG. 2 is a block diagram illustrating the hardware constitution of the POS terminal 11 and the commodity reading apparatus 101.

The POS terminal 11 includes a microcomputer 60 serving as an information processing section. The microcomputer 60 comprises a CPU (Central Processing Unit) 61 which executes various arithmetic processing to control each section of the POS terminal 11, a ROM (Read Only Memory) 62 and a RAM (Random Access Memory) 63. The ROM 62 stores programs executed by the CPU 61. The microcomputer 60 further comprises a well known clock section (not shown) such as an RTC (Real Time Clock) for counting time.

The drawer 21, the keyboard 22, the display device 23, the display for customer 24, a communication interface 25, the touch panel 26, an HDD (Hard Disk Drive) 64, a connection interface 65 and a receipt printer 66 are all connected with the CPU 61 of the POS terminal 11 via various input/output circuits (not shown).

The keyboard 22 includes numeric keys 22d on which numeric characters such as '1', '2', '3' . . . and operators such as multiplying operator '*' are displayed, a temporary closing key 22e and a closing key 22f.

The HDD 64 stores various programs including an OS (Operating System) and applications. When the POS terminal 11 is started, the programs stored in the HDD 64 are all or partially developed on the RAM 63 to be executed by the CPU 61.

The HDD 64 also stores data files such as a PLU file F1 and the like. The PLU file F1 is readable by the commodity reading apparatus 101 via the connection interface 65.

The PLU file F1 is a data file in which a commodity G sold in the store is associated with information relating to the sales registration of the commodity G. FIG. 3 is a diagram schematically illustrating an example of the data arrangement of the PLU file F1. As shown in FIG. 3, a commodity ID uniquely assigned to each commodity G, information relating to a commodity such as a commodity name and a unit price, and a commodity image captured by photographing the commodity G, for each commodity are registered in association with one another in the PLU file F1. Further, in the PLU file F1, feature amount of a commodity G (feature amount data of a reference commodity) is also registered in association with each commodity G.

The commodity image is captured by photographing each commodity to be compared as a reference object at the time of similarity degree determination described later. The commodity image (image of the reference commodity) is displayed as an image showing a commodity candidate at the time of display of the commodity candidate described later. Further, the feature amount of a commodity G previously extracted from the captured image (for example, a commodity image) of each commodity G is registered in association with a corresponding commodity ID in the PLU file F1. The feature amount refers to information representing the feature of the commodity G such as a hue, pattern, concave-convex state, shape and the like of the surface of a commodity G.

In the present embodiment, the feature amount of each commodity G is registered in the PLU file F1 in advance, however, it is not limited to this, and the feature amount may be not registered. In this case, the feature amount may be obtained by extracting from each commodity image by a feature amount extraction section 1613 described later each time it is needed. Further, instead of a commodity image, an image for display may also be registered. Hereinafter, the commodity registered in the PLU file F1 is referred to as a "registered commodity".

Returning to FIG. 2, the communication interface 25 for executing data communication with a store computer SC is connected with the CPU 61 of the POS terminal 11 through the input/output circuit (not shown). The store computer Sc is arranged at a back office and the like in a store. The HDD (not shown) of the store computer SC stores the PLU file F1 to be delivered to the POS terminal 11, a stock management file for managing the stock of each commodity relating to the registered commodity in the PLU file F1, and the like.

The connection interface 65 enables the data transmission/reception with the commodity reading apparatus 101. The commodity reading apparatus 101 is connected with the connection interface 65. The receipt printer 66 prints content of one transaction on a receipt under the control of the CPU 61.

The commodity reading apparatus 101 comprises a commodity reading section 110 and a display and operation section 104. The commodity reading section 110 includes a microcomputer 160. The microcomputer 160 comprises a CPU 161, a ROM 162 and a RAM 163. The ROM 162 stores programs executed by the CPU 161. The microcomputer 160 further comprises a well known clock section (not shown) such as an RTC (Real Time Clock) for counting time.

The image capturing section 164, a sound output section 165 and a connection interface 175 are connected with the CPU 161 through various input/output circuits (not shown). The operations of the image capturing section 164, the sound output section 165 and the connection interface 175 are controlled by the CPU 161.

The image capturing section 164, which is a color CCD sensor or a color CMOS sensor and the like, is an image capturing module for carrying out an image capturing processing through the reading window 103. For example, motion images are captured by the image capturing section 164 at 30 fps. The frame images (captured images) sequentially captured by the image capturing section 164 at a given frame rate are stored in the RAM 163. The sound output section 165 includes a sound circuit and a speaker and the like for issuing a preset alarm sound and the like. The sound output section 165 gives a notification through a sound such as an alarm sound under the control of the CPU 161.

The display and operation section 104 comprises the touch panel 105, the display device 106, the keyboard 107, the display for customer 109 and a connection interface 176. The connection interface 175 of the commodity reading section 110, which is connected with the connection interface 65 of the POS terminal 11, enables the data transmission/reception with the POS terminal 11. The connection interface 175 connects with the display and operation section 104 through the connection interface 176, and the CPU 161 carries out data transmission/reception between the commodity reading section 110 and the display and operation section 104 through the connection interface 175.

Next, the functional components of the CPU 161 and the CPU 61 realized by executing respective programs by the CPU 161 and the CPU 61 are described below with reference to FIG. 4.

Figure 4:
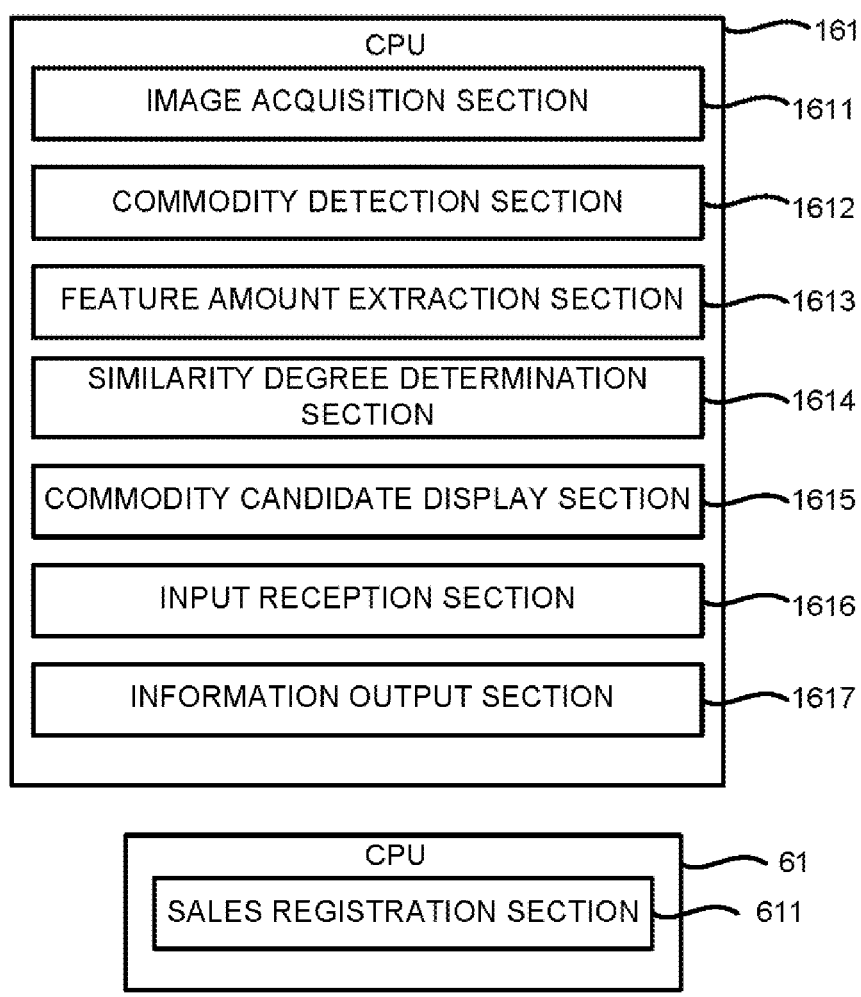
FIG. 4 is a block diagram illustrating functional components of the POS terminal and the commodity reading apparatus shown in FIG. 1.

FIG. 4 is a block diagram illustrating the functional components of the POS terminal 11 and the commodity reading apparatus 101. As shown in FIG. 4, the CPU 161 of the commodity reading apparatus 101 executes programs sequentially to function as an image acquisition section 1611, a commodity detection section 1612, a feature amount extraction section 1613, a similarity degree determination section 1614, a commodity candidate display section 1615, an input reception section 1616 and an information output section 1617.

The image acquisition section 1611 is a functional section corresponding to an acquisition module. The image acquisition section 1611 outputs an ON-signal of image capturing to the image capturing section 164 to enable the image capturing section 164 to start an image capturing operation. The image acquisition section 1611 sequentially acquires images which are captured by the image capturing section 164 after the image capturing operation is started and are stored in the RAM 163. The image acquisition section 1611 acquires the captured images from the RAM 163 in the order the same as that of storing them to the RAM 163.

The commodity detection section 1612 is a functional section corresponding to a detection module. The commodity detection section 1612 detects the whole or part of the contour line of a commodity G contained in the captured image acquired by the image acquisition section 1611 through a known pattern matching technology. Next, by comparing the contour line extracted from the former image (frame image) captured immediately before this time with the contour line extracted from the current image (frame image) captured this time, a different part, i.e., an area, in which a commodity G directed to the reading window 103 is imaged is detected.

As another method for detecting a commodity G, it is determined whether or not a flesh color area is detected from the captured image. If the flesh color area is detected, in other words, the reflection image of the hand of a shop clerk is detected, the aforementioned detection of contour line nearby the flesh color area is carried out to try to extract the contour line of the commodity G that is assumed to be held by the shop clerk. At this time, if a contour line representing the shape of a hand and the contour line of another object nearby the contour line of the hand are detected, the commodity G is detected from the contour line of the object.

The feature amount extraction section 1613 is a functional section corresponding to an extraction module. The feature amount extraction section 1613 extracts, as a feature amount, the surface state (surface hue, pattern, concave-convex state, shape and the like) of the commodity G detected by the commodity detection section 1612 from the captured image acquired by the image acquisition section 1611.

The similarity degree determination section 1614 is a functional section corresponding to a calculation module and a recognition module. The similarity degree determination section 1614 compares the feature amount of each registered commodity in the PLU file F1 of the POS terminal 11 with the feature amount extracted by the feature amount extraction section 1613 to calculate the similarity degree therebetween. Further, the similarity degree determination section 1614 recognizes, in the registered commodities the similarity degrees of which are calculated, the registered commodity (commodity ID) of which the similarity degree is greater than a given threshold value as a candidate (commodity candidate) of the commodity G photographed by the image capturing section 164.

In a case in which there is one registered commodity of which the similarity degree is extremely higher than other similarity degrees within the registered commodities of which the similarity degrees are greater than the threshold value, the similarity degree determination section 1614 has an automatic determination function for determining the one registered commodity having the similarity degree of extremely higher as the commodity candidate. The comparison criteria (threshold value) of similarity degree can be set with a designer's discretion. For example, in comparison with the highest similarity degree calculated for other commodity candidates, the registered commodity having a similarity degree more than 20% higher than the highest similarity degree is automatically determined.

The similarity degree may be a value (similarity degree), which is obtained by comparing the feature amount of the commodity G with the reference feature amount of each commodity registered in the PLU file F1, indicating how much similar the two feature amounts are. The concept of the similarity degree is not limited to the example above. The similarity degree may be a value indicating the degree of coincidence with the feature amount of each registered commodity in the PLU file F1, or a value indicating the degree of correlation between the feature amount of the commodity G and the feature amount of each registered commodity in the PLU file F1.

The recognition of an object contained in an image as stated above is referred to as a general object recognition. As to the general object recognition, various recognition technologies are described in the following document.

Keiji Yanai "Present situation and future of generic object recognition", Journal of Information Processing Society, Vol.

48, No. SIG16 [Search on Heisei 25 December 12], Internet<URL: http://mm.cs.uec.ac.jp/IPSJ-TCVIM-Yanai.pdf>

In addition, the technology carrying out the general object recognition by performing an area-division on the image for each object is described in the following document.

Jamie Shotton etc, "Semantic Texton Forests for Image Categorization and Segmentation", [Search on Heisei 25 December 12], Internet<URL: http://cite seerx.ist.psu.edu/viewdoc/download?doi=10.1.1.145.3036&rep=rep1&type=pdf>

It is noted that no limitation is given to the method for calculating the similarity degree. For example, the similarity degree can be calculated as an absolute evaluation or a relative evaluation. If the similarity degree is calculated as an absolute evaluation, the captured image of the commodity G and each of the registered commodities are compared one by one, and the similarity degree obtained from the comparison result can be adopted as it is. If the similarity degree is calculated as a relative evaluation, the similarity degree is obtained as long as the sum of the similarity degrees between the captured commodity G and each registered commodity becomes 1.0 (100%).

The commodity candidate display section 1615 is a functional section corresponding to a selection module and a display control module. The commodity candidate display section 1615 displays information relating to the registered commodity recognized as a commodity candidate by the similarity degree determination section 1614 on the display device 106. More specifically, the commodity candidate display section 1615 reads out the record of the registered commodity recognized as a commodity candidate from the PLU file F1, and displays it on the commodity candidate screen of the display device 106.

Figure 5:
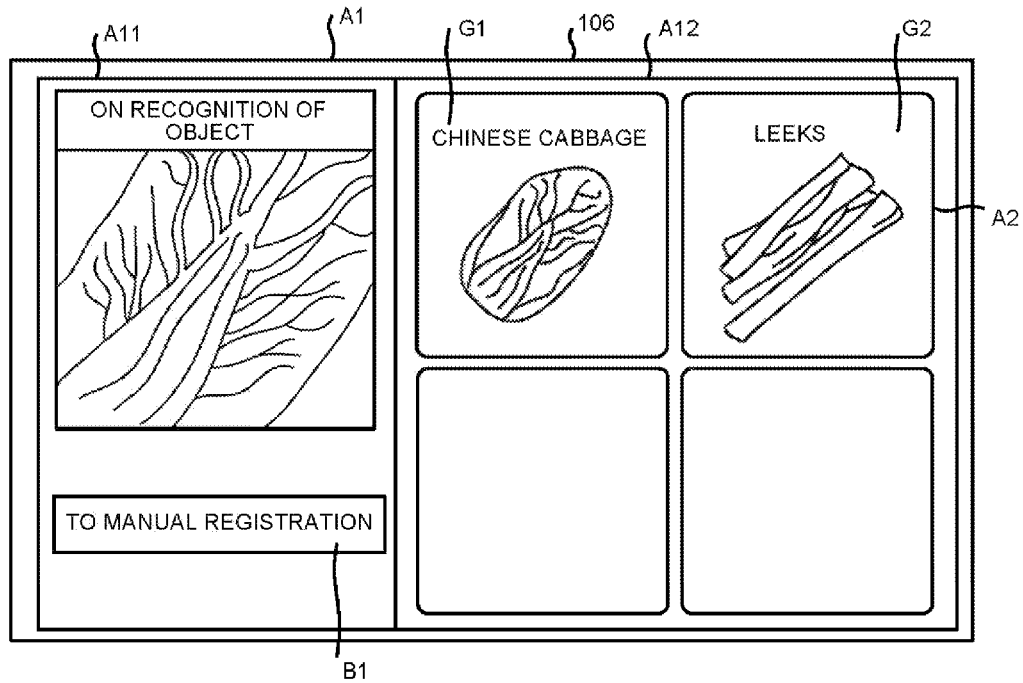
FIG. 5 is a diagram illustrating an example of the display of a commodity candidate screen.

FIG. 5 is a diagram illustrating an example of the display of the commodity candidate screen. The commodity candidate screen A1 displayed on the display device 106 includes a captured image area A11 and a commodity candidate area A12.

The captured image area A11 is used for displaying the captured image acquired by the image acquisition section 1611. A manual registration button B1 is provided at an area below the captured image area A11 to manually carry out the commodity recognition (registration) according to a category code or a commodity list. The CPU 161 displays, on the display device 106, a manual registration screen (not shown) which is used to manually carry out the recognition (registration) of a commodity G in response to the operation of the manual registration button B1. The commodity designated through the manual registration screen is processed as a determined commodity described later.

The commodity candidate area A12 is used for displaying information relating to the registered commodity recognized as a commodity candidate. A plurality of display areas A2 are arranged in the commodity candidate area A12. An example in which four display areas A2 are set in the commodity candidate area A12 is shown in FIG. 5, however, the number of the display areas A2 is not limited. The commodity candidate display section 1615 displays commodity information (G1, G2) such as the commodity image and the commodity name of the commodity candidate in the display area A2. The commodity candidate displayed in the commodity candidate area A12 can be selected through the touch panel 105. With the constitution described above, the operator of the commodity reading apparatus 101 can manually select a commodity candidate corresponding to the commodity G from the commodity candidates displayed in the commodity candidate area A12.

The commodity candidates are displayed in the display area A2 in the descending order of similarity degree, which can improve degree inconvenience at the time of candidate selection. In a case in which such a display method is adopted, the commodity candidates are displayed in the descending order of similarity degree, therefore, the display order (placement order) is interchanged if a commodity candidate having a similarity degree higher than that of the commodity candidate presently displayed appears. In this case, if the display order of commodity candidates is interchanged at the timing the operator just executes selection action on a commodity candidate on the display screen, there is a possibility that the operator unintentionally selects a commodity candidate not desired.

Thus, to avoid the occurrence of the foregoing incorrect selection, the commodity candidate display section 1615 displays the commodity candidates recognized by the similarity degree determination section 1614 in two stages so as not to change each display position (order).

Specifically, during a given time period (hereinafter referred to as a waiting time period) in which the similarity degree determination section 1614 is executing processing relating to the commodity candidate recognition, the commodity candidate display section 1615 waits for display of the commodity candidates. If the waiting time period elapses, the commodity candidate display section 1615 places commodity information of the commodity candidates, which are recognized by the similarity degree determination section 1614 during the waiting time period, in the display area A2 on the display screen in the descending order of similarity degree to display the commodity information.

Further, if commodity candidates are recognized by the similarity degree determination section 1614 after the waiting time period elapses, the commodity candidate display section 1615 sequentially places information corresponding to the later recognized commodities in the display area A2 to display the commodity information.

For example, the commodity candidates "Chinese cabbage" and "leeks" are recognized during the waiting time period, and the similarity degree of the "Chinese cabbage" is higher than that of the "leeks". In this case, as shown in FIG. 5, the commodity candidate display section 1615 places information G1 and G2 corresponding to the commodity candidates "Chinese cabbage" and "leeks" in the display area A2 in the descending order of similarity degree (first the "Chinese cabbage" and then the "leeks") to display the commodity information G1 and G2 simultaneously. Though the placement of the commodity candidates in the commodity candidate area A12 in FIG. 5 is carried out in the order from the display area A2 at upper left to the display area A2 at upper right, and then from the display area A2 at lower left to the display area A2 at lower right, however, the placement order is not limited to this example.

Figure 6:
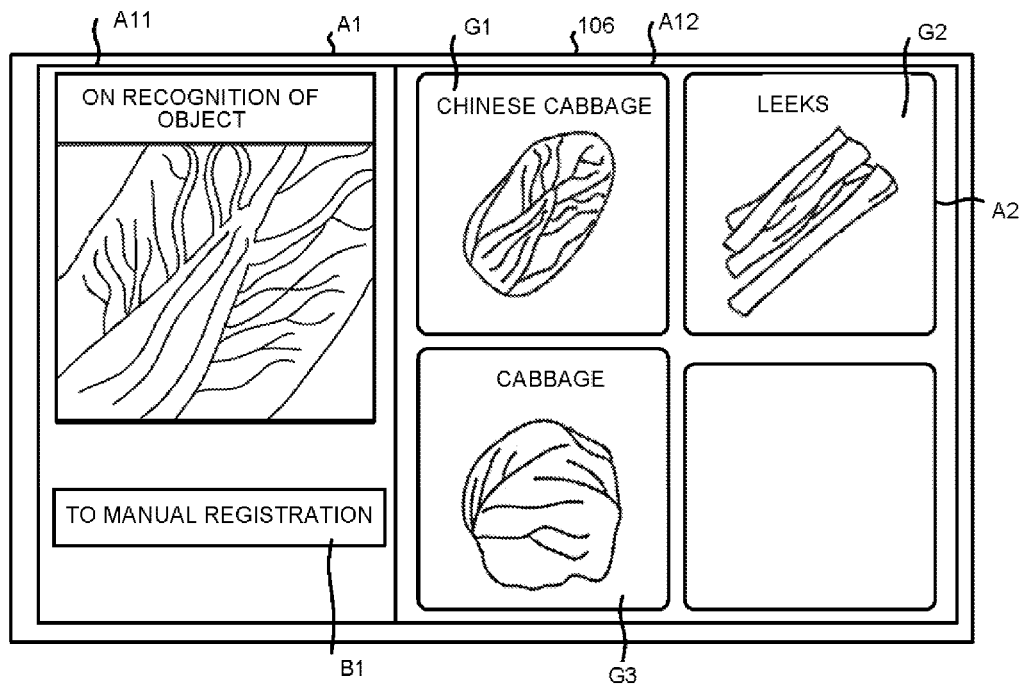
FIG. 6 is a diagram illustrating an example of the display of the commodity candidate screen proceeding from the display screen shown in FIG. 5.
Figure 7:
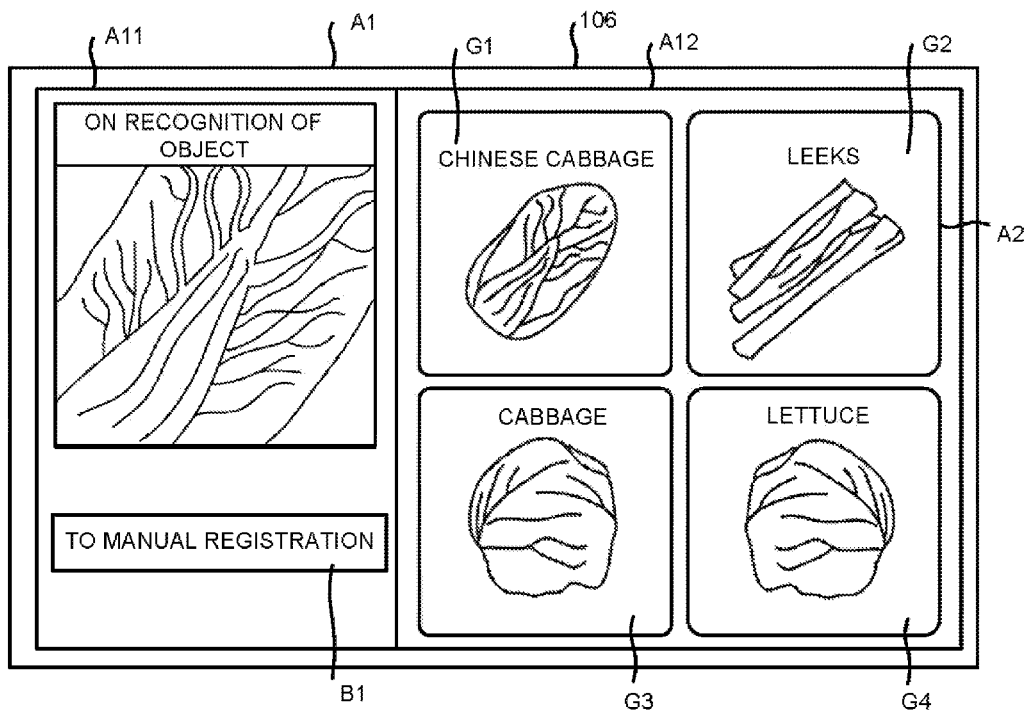
FIG. 7 is a diagram illustrating an example of the display of the commodity candidate screen further proceeding from the display screen shown in FIG. 6.

On the other hand, it is assumed that the commodity candidates "cabbage" and "lettuce" are recognized sequentially after the waiting time period elapses. In this case, as shown in FIG. 6, the commodity candidate display section 1615 places commodity information G3 corresponding to a "cabbage" in the display area A2 at the timing the "cabbage" is recognized to display the commodity information G3 in succession to the display shown in FIG. 5. Then, as shown in FIG. 7, the commodity candidate display section 1615 also places commodity information G4 corresponding to a "lettuce" in the display area A2 at the timing the "lettuce" is recognized to display the commodity information G4 in succession to the display shown in FIG. 6. In the examples shown in FIG. 5-FIG. 7, if there are empty display areas A2 in which no commodity candidate is displayed in a state in which the display of the commodity candidates ("Chinese cabbage" and "leeks") recognized during the waiting time period is maintained, the commodity candidates ("cabbage" and "lettuce") recognized after the waiting time period elapses are respectively displayed in the empty display areas A2. If the number of the commodity candidates recognized during the waiting time period is equal to the number of the display areas A2, the commodity candidates recognized after the waiting time period elapses are not displayed in the display area A2.

As stated above, the commodity candidate display section 1615 displays the commodity candidates recognized before the given waiting time period elapses in the descending order of similarity degree, and displays the commodity candidates recognized after the waiting time period elapses in sequence from the next to the commodity candidates presently displayed. In this way, the display position (order) of the commodity candidates (commodity information) presently displayed can be maintained even if further display of new commodity information is executed, which can reduce occurrence of the incorrect selection caused by the interchange of the display order. Further, the commodity candidates recognized before the waiting time period elapses are displayed in the descending order of similarity degree, which can improve degree in convenience relating to the display of the commodity candidates and also improve the operability relating to the selection of the commodity candidate.

The length of the waiting time period can be set to any value, such as 500 milliseconds. The base point to start counting the waiting time period may be set freely. In the present embodiment, the timing the commodity detection section 1612 detects a commodity G from the captured image is set as the base point to start counting the waiting time period.

Returning to FIG. 4, the input reception section 1616 receives various input operations corresponding to the display of the display device 106 through the touch panel 105 or the keyboard 107. For example, the input reception section 1616 receives a selection operation of one commodity candidate from the commodity candidates displayed on the display device 106. The input reception section 1616 receives input of the selected commodity candidate as the commodity (determined commodity) corresponding to the commodity G photographed by the image capturing section 164. In a case in which the commodity detection section 1612 has a capability of detecting a plurality of commodities G, the input reception section 1616 may receive selection operations of a plurality of commodity candidates from the commodity candidates.

The information output section 1617 outputs information (for example, the commodity ID, the commodity name and the like) indicating the commodity determined in the aforementioned manner to the POS terminal 11 through the connection interface 175.

The information output section 1617 may also output the sales volume separately input through the touch panel 105 or the keyboard 107 to the POS terminal 11 together with the commodity ID and the like. As to information output to the POS terminal 11 by the information output section 1617, the information output section 1617 may directly notify of the commodity ID read from the PLU file F1, or the commodity name or the file name of the commodity image capable of specifying the commodity ID may be notified, or the storage location of the commodity ID (storage address in the PLU file F1) may also be notified.

On the other hand, the CPU 61 of the POS terminal 11 has a function of a sales registration section 611 by executing programs. The sales registration section 611 carries out the sales registration of a commodity, using the commodity ID and the sales volume output from the information output section 1617 of the commodity reading apparatus 101. Specifically, the sales registration section 611 carries out, with reference to the PLU file F1, the sales registration by recording the notified commodity ID and the commodity category, commodity name and unit price specified with the commodity ID in a sales master file together with the sales volume.

Figure 8:
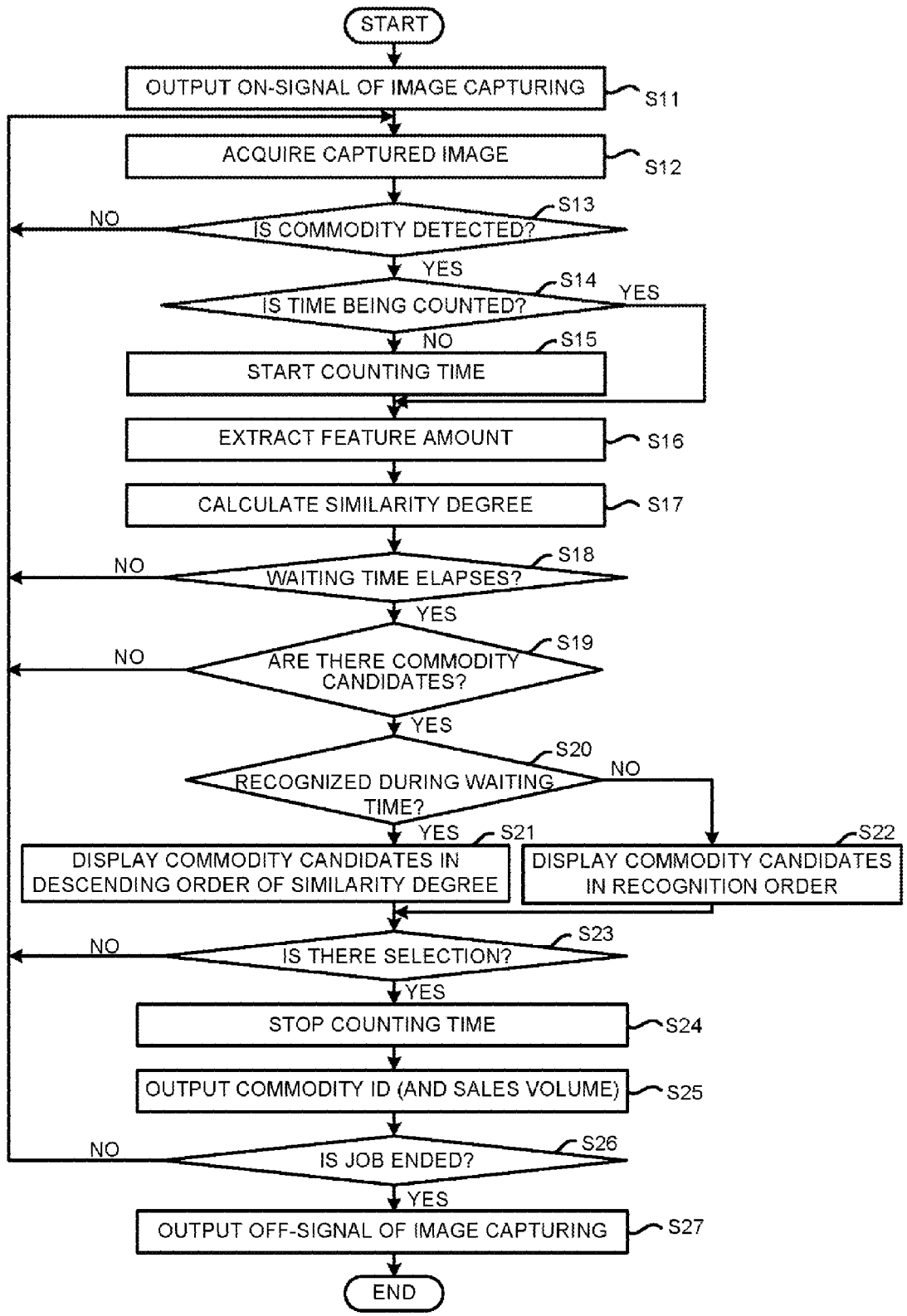
FIG. 8 is a flowchart illustrating a procedure of a commodity recognition processing executed by the commodity reading apparatus.

Hereinafter, the operations of the checkout system 1 are described. First, the operations of the commodity reading apparatus 101 are described with reference to FIG. 8. FIG. 8 is a flowchart illustrating the procedure of the commodity recognition processing executed by the commodity reading apparatus 101. The premise of the processing is that the commodity candidate screen A1 is displayed on the display device 106.

When the processing is started in response to the start of the commodity registration by the POS terminal 11, the image acquisition section 1611 outputs an ON-signal of image capturing to the image capturing section 164 to enable the image capturing section 164 to start an image capturing operation (ACT S11).

The image acquisition section 1611 acquires a frame image (captured image) that is captured by the image capturing section 164 and is stored in the RAM 163 (ACT S12). Next, the commodity detection section 1612 detects the whole or part of the commodity G from the captured image acquired in ACT S12 (ACT S13). If the commodity G is not detected (NO in ACT S13), ACT S12 is executed.

If the commodity G is detected in ACT S13 (YES in ACT S13), the commodity candidate display section 1615 determines whether or not the waiting time is being counted (ACT S14). If the waiting time is being counted (YES in ACT S14), ACT S16 is taken. On the contrary, if the waiting time is not counted (NO in ACT S14), the commodity candidate display section 1615 starts the counting of the waiting time (ACT S15), and then ACT S16 is taken.

The feature amount extraction section 1613 extracts the feature amount of the commodity G detected in ACT S13 from the captured image acquired in ACT S12 (ACT S16). The similarity degree determination section 1614 compares the feature amount extracted in ACT S16 with the feature amount of each registered commodity in the PLU file F1 to calculate similarity degrees respectively (ACT S17). Then, if there is a registered commodity of which the similarity degree in the calculated similarity degrees is greater than a given threshold value, the similarity degree determination section 1614 recognizes the registered commodity (commodity ID) as a commodity candidate.

Next, the commodity candidate display section 1615 determines whether or not the waiting time period elapses (ACT S18). If it is determined that the waiting time period does not elapse (NO in ACT S18), ACT S12 is executed again. On the contrary, if it is determined that the waiting time period elapses (YES in ACT S18), the commodity candidate display section 1615 determines whether or not there is a commodity candidate recognized by the similarity degree determination section 1614 (ACT S19).

In ACT S19, if it is determined that there is no commodity candidate (NO in ACT S19), ACT S12 is executed again. On the contrary, if it is determined that there are commodity candidates (YES in ACT S19), the commodity candidate display section 1615 determines whether or not the commodity candidates are recognized during the waiting time period (ACT S20).

If the commodity candidates are recognized during the waiting time period (YES in ACT S20), the commodity candidate display section 1615 displays the commodity candidates on the display screen in the descending order of similarity degree (ACT S21). More specifically, the commodity candidate display section 1615 reads the record of each commodity candidate (registered commodity) from the PLU file F1 and places the record in the display area A2 in the descending order of similarity degree to display all the commodity candidates recognized during the waiting time period with a single (one time) display processing.

On the other hand, if the commodity candidates are recognized after the waiting time period elapses (NO in ACT S20), the commodity candidate display section 1615 sequentially displays the commodity candidates in the order of recognition performed (ACT S22) in succession to the present display on the display screen. More specifically, the commodity candidate display section 1615 reads the records of the commodity candidates from the PLU file F1 and places the records in the display area A2 in sequence to display the commodity candidates in the order of recognition performed.

Next, the input reception section 1616 determines whether or not the selection of the commodity candidate is received through the touch panel 105 or the keyboard 107 (ACT S23). If no selection operation of the commodity candidate is received (NO in ACT S23), ACT S12 is executed again.

In ACT S23, if an operation of selecting any one of the commodity candidates is received (YES in ACT S23), the commodity candidate display section 1615 stops counting time (ACT S24). In this way, the counting of waiting time relating to one commodity G is stopped.

Next, the information output section 1617 outputs information such as a commodity ID and the like indicating the determined commodity to the POS terminal 11 (ACT S25), and then ACT S26 is taken. In a case in which the sales volume is input separately through the touch panel 105 or the keyboard 107, the sales volume is also output to the POS terminal 11 together with information indicating the determined commodity in ACT S25. If the sales volume is not input, the sales volume "1" may be output as a default value.

In ACT S26, the CPU 161 determines whether or not the job is ended with a notification of the termination of the commodity registration from the POS terminal 11 (ACT S26). If the job is continued (NO in ACT S26), the CPU 161 returns to the processing in ACT S12 to continue the processing. If the job is ended (YES in ACT S26), the image acquisition section 1611 terminates the image capturing by the image capturing section 164 by outputting an OFF-signal of image capturing to the image capturing section 164 (ACT S27), then the commodity recognition processing is ended.

Figure 9:
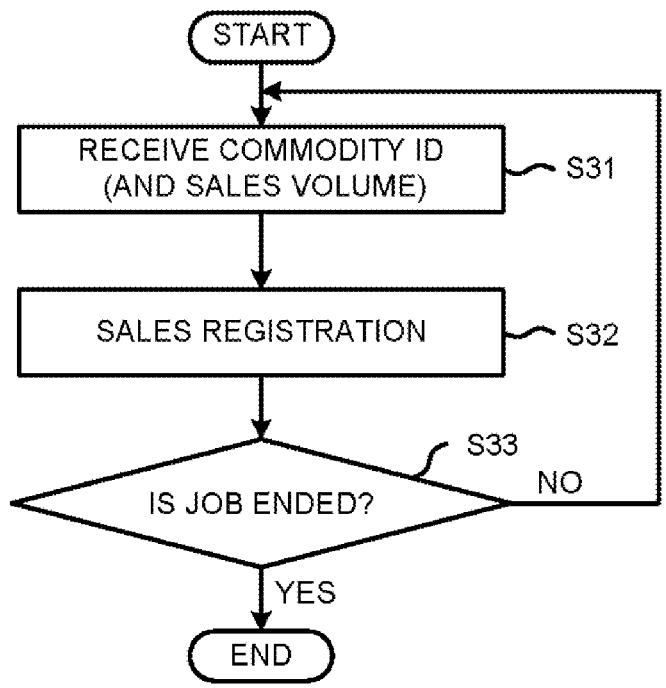
FIG. 9 is a flowchart illustrating a procedure of a sales registration processing executed by the POS terminal.

Next, the processing operations of the POS terminal 11 are described. FIG. 9 is a flowchart illustrating the procedure of the sales registration processing executed by the POS terminal 11.

First, when the processing is started in response to a start of the commodity registration according to an operation instruction through the keyboard 22, the CPU 61 receives the commodity ID and the sales volume of the determined commodity output by the commodity reading apparatus 101 in ACT S25 of FIG. 8 (ACT S31). Then, based on the commodity ID and the sales volume received in ACT S31, the sales registration section 611 reads the commodity category, the unit price and the like, which are associated with the received commodity ID, from the PLU file F1 and further the received sales volume is multiplied by the read out unit price to register the sales of the commodity G read by the commodity reading apparatus 101 in the sales master file in association with the received commodity ID (ACT S32).

Then, the CPU 61 determines whether or not the job is ended due to the end of the sales registration according to the operation instruction through the keyboard 22 (ACT S33). If the job is continued (NO in ACT S33), the CPU 61 returns to ACT S31 to continue the processing. If the job is ended (YES in ACT S33), the CPU 61 terminates the sales registration processing.

While certain embodiments have been described, these embodiments have been presented by way of example only, and are not intended to limit the scope of the present invention. Indeed, the novel embodiments may be embodied in a variety of other forms; furthermore, various omissions, substitutions, variations and supplementations thereof may be devised without departing from the spirit of the present invention. The accompanying claims and their equivalents are intended to cover such forms and modifications as would fall within the scope and spirit of the present invention.

For example, it is exemplified in the embodiment described above that the counting of the waiting time is started at the timing the commodity detection section 1612 detects a commodity G from the captured image, however, the present invention is not limited to this. For example, the counting of the waiting time may be started at the timing the similarity degree determination section 1614 starts the processing relating to the recognition of the commodity candidate. Specifically, the timing the extraction of the feature amount or the calculation of the similarity degree is started may be set as the base point at which the counting of the waiting time starts.

Further, the counting of the waiting time may also be started at the timing the similarity degree determination section 1614 first recognizes a commodity candidate of the commodity G. In a case in which such a modification is adopted, the counting of the waiting time is not carried out if no commodity candidate is recognized. Thus, even in a case in which much time is needed until a commodity candidate is first recognized, the commodity candidates recognized during a period (waiting time period) from the moment a commodity candidate is first recognized to the moment the waiting time period elapses can be displayed on the display screen in the descending order of similarity degree, which can improve degree in convenience.

In the embodiment stated above, the POS terminal 11 is arranged to include the PLU file F1, however, it is not limited to this, and all or part of the PLU file F1 may be included in the commodity reading apparatus 101.

Further, it is arranged in the embodiment stated above that the recognition of the commodity candidate is carried out in the commodity reading apparatus 101, however, all or part of the functional sections of the commodity reading apparatus 101 may be included in the POS terminal 11.

For example, the POS terminal 11 may comprise the feature amount extraction section 1613 and the similarity degree determination section 1614, while the commodity reading apparatus 101 may comprise the image acquisition section 1611, the commodity detection section 1612, the commodity candidate display section 1615, the input reception section 1616 and the information output section 1617. In this case, the commodity reading apparatus 101 transmits the captured image, acquired by the image acquisition section 1611, from which the commodity is detected by the commodity detection section 1612, to the POS terminal 11. Then the commodity reading apparatus 101 receives the result of the recognized commodities (registered commodities) by the POS terminal 11, and displays the received result as the commodity candidates through the commodity candidate display section 1615. Further, in a case in which the POS terminal 11 comprises all the functional sections of the commodity reading apparatus 101, the commodity reading apparatus 101 functions as an image capturing device, and the POS terminal 11 carries out the display of the commodity candidates based on the captured image sent from the commodity reading apparatus 101.

In the embodiment stated above, a stationary type scanner apparatus (commodity reading apparatus 101) is used, as an example, however, it is not limited to this, and a so-called handy type scanner device connected with the POS terminal 11 may be employed.

Further, according to the embodiment stated above, in a checkout system 1 consisting of the POS terminal 11 and the commodity reading apparatus 101, the present invention is applied to the commodity reading apparatus 101, however, it is not limited to this, and it may also be applied to a single apparatus comprising all the functions of the POS terminal 11 and the commodity reading apparatus 101, or a checkout system 1 constituted by, for example, connecting the commodity reading apparatus 101 and the POS terminal 11 shown in FIG. 1 in a wired or wireless manner. As an apparatus comprising all the functions of the POS terminal 11 and the commodity reading apparatus 101, a self-checkout terminal (hereinafter referred to as a self-checkout POS) installed in a store such as a supermarket and the like is known.

Figure 10:
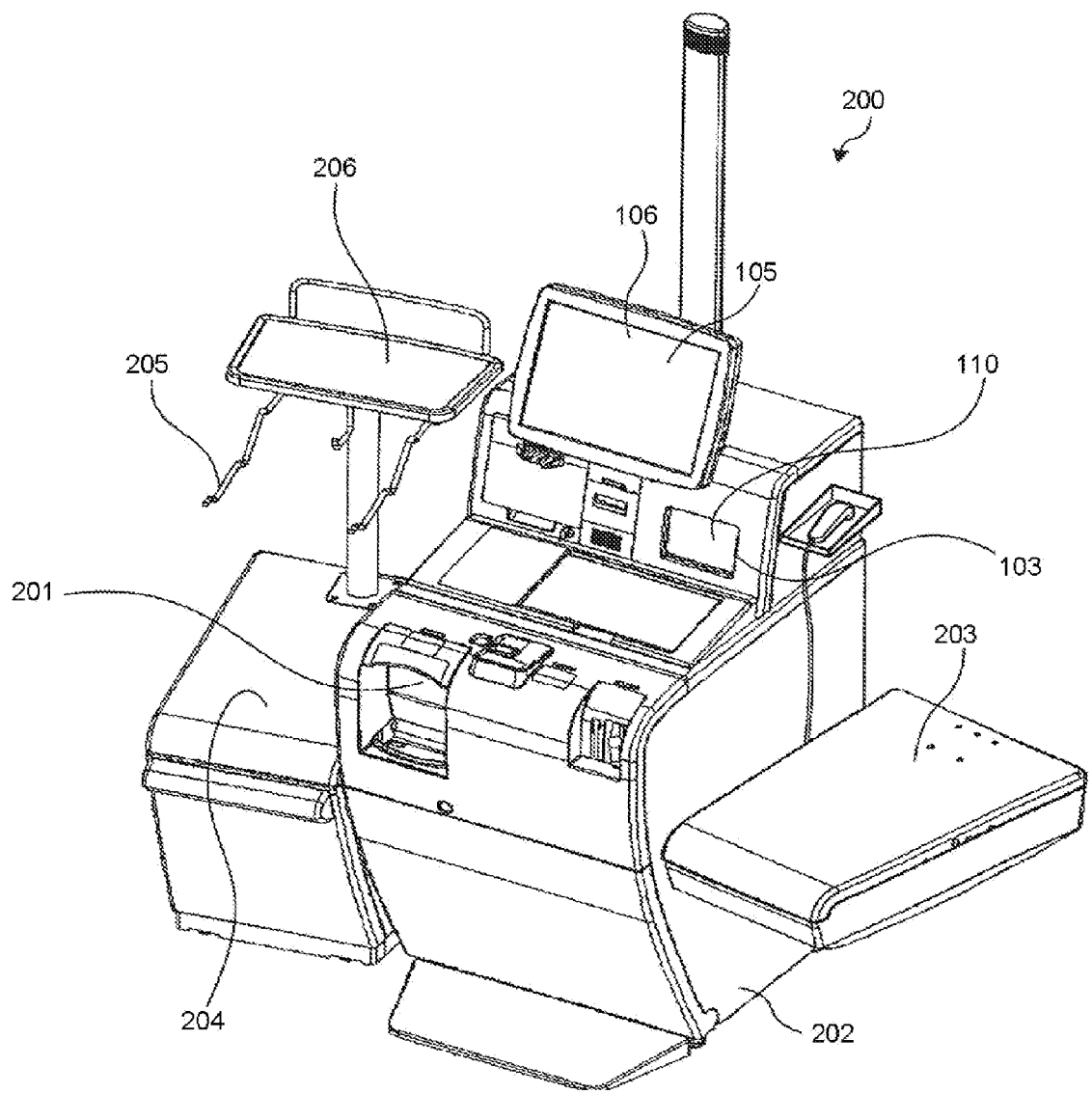
FIG. 10 is a perspective view illustrating an external constitution of a self-checkout POS terminal according to the embodiment.
Figure 11:
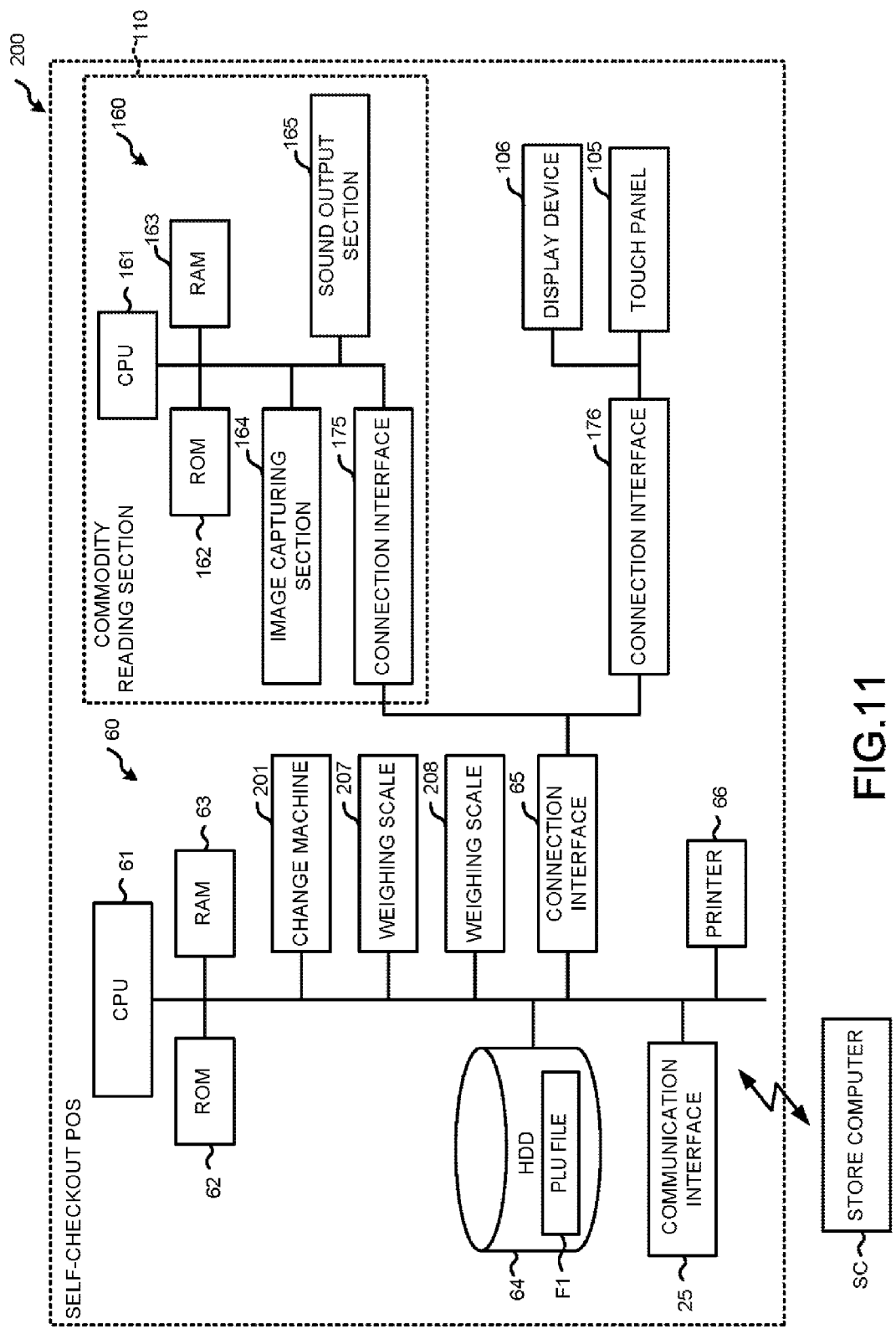
FIG. 11 is a block diagram illustrating a hardware constitution of the self-checkout POS terminal shown in FIG. 10.

FIG. 10 is a perspective view illustrating the external constitution of the self-checkout POS 200, and FIG. 11 is a block diagram illustrating the hardware constitution of the self-checkout POS 200. Hereinafter, the same numerals are applied to the components similar to that in FIG. 1 and FIG. 2, and therefore the detailed descriptions thereof are not repeated.

As shown in FIG. 10 and FIG. 11, a main body 202 of the self-checkout POS 200 comprises a display device 106 having a touch panel 105 on the surface thereof and a commodity reading section 110 which captures a commodity image to recognize (detect) the category of the commodity.

The display device 106 may be, for example, a liquid crystal display. The display device 106 displays a guidance screen for providing customers with a guidance for the operation of the self-checkout POS 200, various input screens, a registration screen for displaying the commodity information captured by the commodity reading section 110 and a settlement screen on which a total amount of the commodities, a deposit amount and a change amount are displayed for selecting a payment method.

The commodity reading section 110 captures a commodity image through the image capturing section 164 when the customer holds the code symbol attached to the commodity to the reading window 103 of the commodity reading section 110.

Further, the self-checkout POS 200 includes a commodity placing table 203 for placing a shopping basket (unsettled basket) in which an unsettled commodity is put at the right side of the main body 202, and another commodity placing table 204 for placing a shopping basket (settled basket) in which a settled commodity is put after the sales registration thereof is executed at the left side of the main body 202. A bag hook 205 for hooking a bag for placing the settled commodities therein and a temporary placing table 206 for placing the settled commodities temporarily before the settled commodities are put into a bag are also provided at the left side of the main body 202. The commodity placing tables 203 and 204 are equipped with weighing scales 207 and 208 respectively, and are therefore capable of confirming whether or not the weight of commodity (commodity taken out of the unsettled basket and commodity put into the settled basket) is the same before and after a settlement of the commodity is executed.

Further, a change machine 201 for receiving bill for settlement and discharging bill as change is arranged in the main body 202 of the self-checkout POS 200.

In a case in which the present invention is applied to the self-checkout POS 200 having such constitutions as described above, the self-checkout POS 200 functions as an information processing apparatus. Further, a single apparatus comprising the functions of the POS terminal 11 and the commodity reading apparatus 101 is not limited to the self-checkout POS 200 having the above-constitutions and it may be an apparatus without having weighing scales 207 and 208.

Further, in the embodiment above, the programs executed by each apparatus are pre-installed in the storage medium (ROM or storage section) of each apparatus, however, the present invention is not limited to this, the programs may be recorded in a computer-readable recording medium such as CD-ROM, flexible disk (FD), CD-R, DVD (Digital Versatile Disk) in the form of installable or executable file. Further, the storage medium, which is not limited to a medium independent from a computer or an incorporated system, further includes a storage medium for storing or temporarily storing the downloaded program transferred via an LAN or the Internet.

In addition, the programs executed by each apparatus described in the embodiment above may be stored in a computer connected with a network such as the Internet to be provided through a network download or distributed via a network such as the Internet.

Alternatively, the programs mentioned in the embodiment above may be incorporated in a portable information terminal such as a mobile phone having a communication function, a smart phone, a PDA (Personal Digital Assistant) and the like to realize the functions of the programs.

What is claimed is:

1. An information processing apparatus, comprising:
   an acquisition module configured to acquire an image of a commodity;
   a detection module configured to detect the commodity from the image acquired by the acquisition module;
   a recognition module configured to compare the feature amount of the commodity detected by the detection module with the feature amount of each reference commodity to recognize the reference commodity of which the similarity degree is greater than a threshold value as a commodity candidate;
   a commodity candidate display module configured to display the commodity candidates recognized before a given waiting time period elapses in the descending order of similarity degree, and then successively display the commodity candidates recognized after the waiting time period elapses in sequence without changing the display order of the commodity candidates recognized before the given waiting time period elapses; and
   a reception module configured to receive an operation of selecting one from the displayed commodity candidates.

2. The information processing apparatus according to claim 1, wherein the commodity candidate display module starts counting time at the timing the detection module detects the commodity, and waits to display the commodity candidates until the waiting time period elapses based on the counting time.

3. The information processing apparatus according to claim 1, wherein the commodity candidate display module starts counting time at the timing the recognition module starts the processing relating to the recognition of the commodity candidate, and waits to display the commodity candidates until the waiting time period elapses based on the counting time.

4. The information processing apparatus according to claim 1, wherein the commodity candidate display module starts counting time at the timing the recognition module first recognizes the commodity candidate, and waits to display the commodity candidates until the waiting time period elapses based on the counting time.

5. The information processing apparatus according to claim 1, wherein the commodity candidate display module continues the display of the commodity candidates until the reception module receives the selection operation for the commodity candidates.

6. The information processing apparatus according to claim 1, wherein the commodity candidates recognized before the given waiting time period elapses are displayed simultaneously.

7. The information processing apparatus according to claim 1, wherein the commodity candidates recognized after the given waiting time period elapses are displayed in sequential order in a position following the commodity candidates recognized before the given waiting time period elapses.

8. A method for displaying a commodity candidate by an information processing apparatus, including:
    acquiring an image of a commodity;
    detecting the commodity from the acquired image;
    comparing the feature amount of the detected commodity with the feature amount of each reference commodity to recognize the reference commodity of which the similarity degree is greater than a threshold value as a commodity candidate;
    displaying the commodity candidates recognized before a given waiting time period elapses in the descending order of similarity degree;
    successively displaying the commodity candidates recognized after the waiting time period elapses in sequence without changing the display order of the commodity candidates recognized before the given waiting time period elapses; and
    receiving an operation of selecting one from the displayed commodity candidates.

9. The method for displaying a commodity candidate of claim 8, wherein the commodity candidates recognized before the given waiting time period elapses are displayed simultaneously.

10. The method for displaying a commodity candidate of claim 8, wherein the commodity candidates recognized after the given waiting time period elapses are displayed in sequential order in a position following the commodity candidates recognized before the given waiting time period elapses.

* * * * *